United States Patent
Lu (10) Patent No.: US 8,472,458 B2
(45) Date of Patent: Jun. 25, 2013

(54) BUFFER SPACE ALLOCATION METHOD AND RELATED PACKET SWITCH

(75) Inventor: Kuo-Cheng Lu, Hsinchu (TW)

(73) Assignee: Ralink Technology Corp., Jhubei, Hsinchu County (TW)

( * ) Notice: Subject to any disclaimer, the term of this patent is extended or adjusted under 35 U.S.C. 154(b) by 336 days.

(21) Appl. No.: 12/894,196

(22) Filed: Sep. 30, 2010

(65) Prior Publication Data

US 2011/0103245 A1    May 5, 2011

(30) Foreign Application Priority Data

Oct. 29, 2009  (TW) .................................. 98136640 A (51) Int. Cl.
*H04L 12/28* (2006.01)
(52) U.S. Cl.
USPC .......................................... 370/413
(58) Field of Classification Search
None
See application file for complete search history.

(56) References Cited

U.S. PATENT DOCUMENTS

| 5,541,912 | A  | * | 7/1996  | Choudhury et al. | 370/412 |
| 7,349,334 | B2 | * | 3/2008  | Rider            | 370/229 |
| 7,382,728 | B2 |   | 6/2008  | Chen             |         |
| 7,801,163 | B2 | * | 9/2010  | Mansour et al.   | 370/412 |
| 2001/0050913 | A1 | * | 12/2001 | Chen et al.   | 370/360 |
| 2002/0089933 | A1 | * | 7/2002  | Giroux et al. | 370/236 |
| 2002/0141427 | A1 | * | 10/2002 | McAlpine      | 370/413 |
| 2003/0067931 | A1 | * | 4/2003  | Mansour et al.| 370/412 |
| 2004/0085979 | A1 | * | 5/2004  | Lee et al.    | 370/412 |
| 2006/0176893 | A1 | * | 8/2006  | Ku et al.     | 370/412 |

FOREIGN PATENT DOCUMENTS

TW    I227080    1/2005

* cited by examiner

*Primary Examiner* — Otis L Thompson, Jr.
(74) *Attorney, Agent, or Firm* — Winston Hsu; Scott Margo

(57) ABSTRACT

A buffer space allocation method for a packet switch includes periodically performing a measurement process to obtain a plurality of measurement results at different times, each measurement result indicating a total size of accumulated packets in an output queue corresponding to one of a plurality of network ports of the packet switch, and adjusting a dedicated buffer space of the output queue according to the plurality of measurement results and a reserved space value for the dedicated buffer space.

18 Claims, 9 Drawing Sheets

BUFFER SPACE ALLOCATION METHOD AND RELATED PACKET SWITCH

BACKGROUND OF THE INVENTION

1. Field of the Invention

The present invention relates to a buffer space allocation method and related packet switch, and more particularly, to a buffer space allocation method and related packet switch adaptively adjusting the dedicated buffer space for an output queue according to the number of packets in the output queue.

2. Description of the Prior Art

With the rapid development of the Internet, the packet switch technique is also improving day by day to meet the requirements of transmission quality and rate of the public. Based on different queue allocation method, the packet switch can be catalogued into the output queued switch, the input queued switch, the combined input output queued switch, etc, wherein the output queued switch allocates buffer resources for output ports of packet switch, and is most effective. The most common output queued switch scheme is the shared-buffer output queued switch, wherein the packet buffer is shared among all output ports. Theoretically, the effectiveness of buffer of shared buffer packet switch is higher than that of non-shared buffer packet switch.

Figure 1:
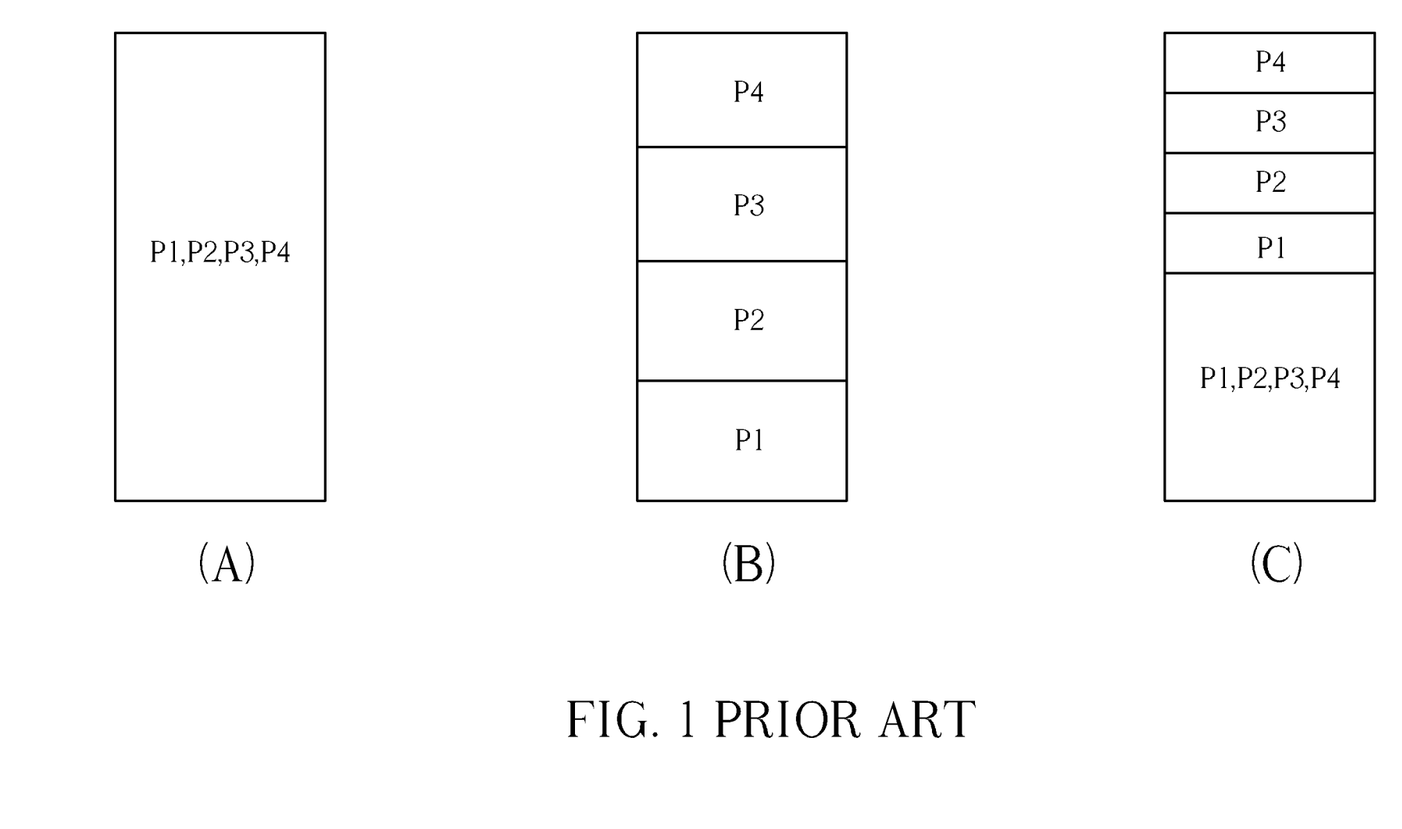
FIG. 1A to FIG. 1C are diagrams of resources allocations of a buffer of a shared-buffer output queue switch according to the prior art.

Please refer to FIG. 1A to FIG. 1C. The FIG. 1A to FIG. 1C are diagrams of resources allocations of a buffer of a shared-buffer output queued switch according to the prior art, which assume the bidirectional network ports P1-P4 of output queued switch share the buffer. FIG. 1A indicates that the whole buffer are common to the network ports P1-P4, while this allocation method may easily results in a starvation phenomenon that no buffer space is available for parts of the network ports; for example, all of the buffer space is occupied by the network ports P1 and P4, while no buffer space is available for the network ports P2 and P3. To avoid the above starvation phenomenon, the prior art has provided another relatively fair allocation method, as shown in FIG. 1B. FIG. 1B indicates that the buffer is equally shared by the network ports P1-P4, while each of the network ports has dedicated buffer space without sharing. Nevertheless, in practice, the packet throughput of each network port may not equal. When packets are inputted from the network ports P1, P2, and P3, and all purpose to be outputted from the network port P4, a packet loss will occur under the situation that the dedicated buffer space reserved for the network port P4 has been used up. The allocation method of FIG. 1C is the mixture of FIG. 1A and FIG. 1B that parts of the buffer space is equally shared by the network ports P1-P4, whereas the others are common to the network ports P1-P4, called mixed sharing mode. As regards the above three allocation methods, the mixed sharing mode in FIG. 1C acquires a better balance between the starvation phenomenon and the effectiveness of buffer, and is most commonly used in present packet switches. In addition, the dedicated buffer space reserved for each network port can be further divided into a plurality of subspace according to the transmission services with different priorities, such as audio, video, or data, corresponding to different output queues.

Figure 2:
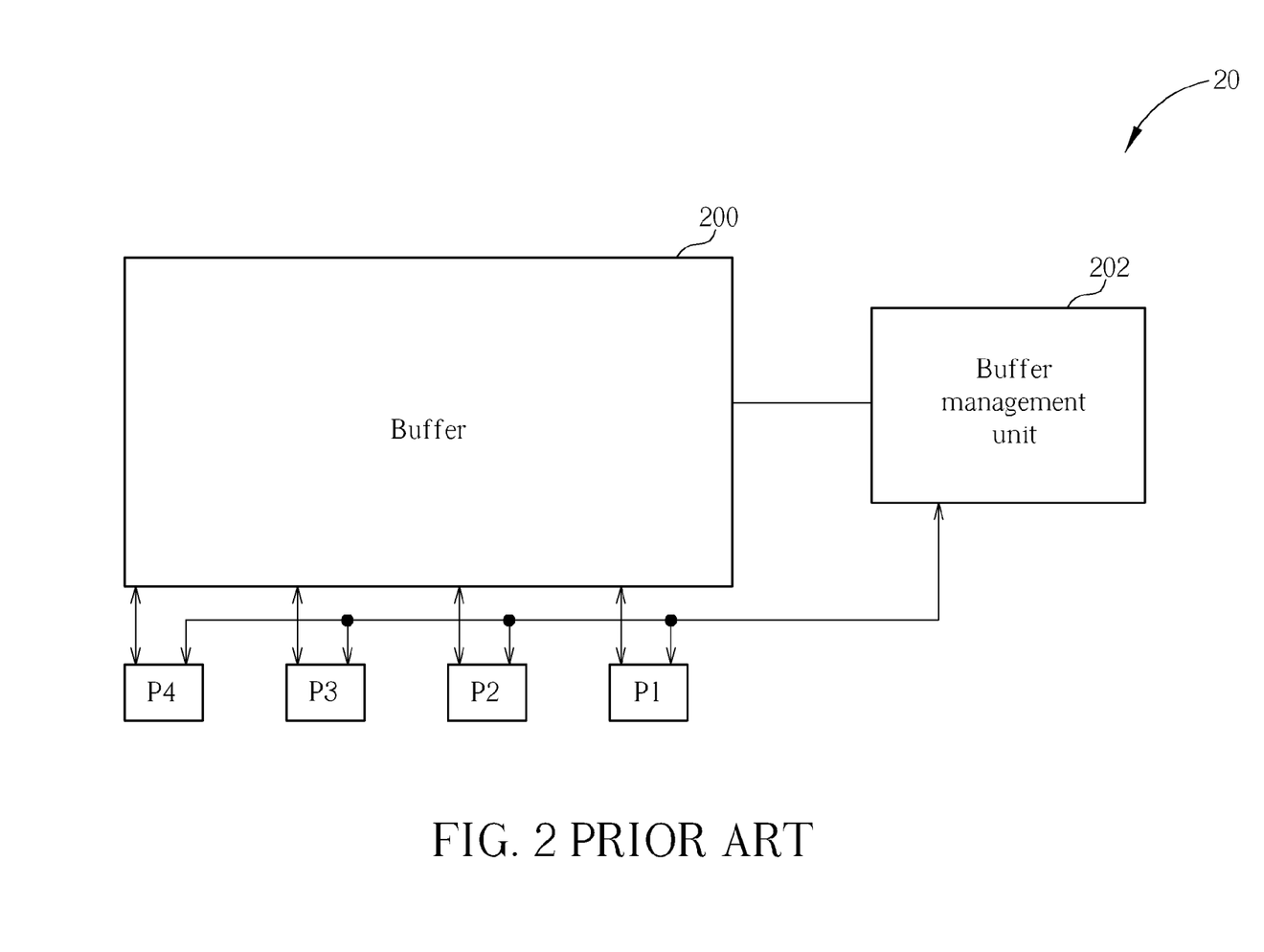
FIG. 2 is a schematic diagram of a packet switch according to the prior art.

Please refer to FIG. 2. FIG. 2 is a schematic diagram of a packet switch 20 according to the prior art. The packet switch 20 is a shared-buffer output queued switch comprising a buffer 200, a buffer management unit 202 and four bidirectional network ports P1-P4, wherein the allocation method of the buffer 200 belongs to the mixed sharing mode illustrated in FIG. 1C. The buffer management unit 202 is coupled to the buffer 200 and the network ports P1-P4, which allocates available buffer resources to corresponding output ports to temporary store packets according to buffer resources request signals received by each input port, and removes the occupational status of buffer resources after the packet transmission is finished. The network port P1 is a hot spot, such as a wide area network port of a router. It can be shown from FIG. 2 that only few packets are waiting to be outputted from the network ports P2, P3, or P4, and there is surplus of the dedicated buffer space reserved for the network ports, whereas packets waiting to be outputted from the network port P1 is too many and exhausts the dedicated buffer space, and the common buffer space for all network ports must be utilized. The maximum buffer space that can be utilized by network port P1 equals the dedicated buffer space reserved for the network port P1 and the common buffer space; the network ports P2, P3, and P4 maintains each dedicated buffer space.

Please note that FIG. 2 takes 4 network ports as an example for the sake of convenience. In practice, the number of network ports in a packet switch is usually mounted to a few tens. In a high network port density packet switch, only few output queues of network ports may have a large number of packets waiting to be transmitted, while most of the output queues of network ports do not contain too many packets. Under the circumstances, if the mixed sharing mode in FIG. 1C is applied, most of the buffer space would be occupied by network ports that do not need to transmit too many packets, and hence the common buffer space is curtailed. Therefore, the network ports which need more buffer space have no sufficient buffer space to be utilized, resulting in a large decrease of effectiveness of buffer and an easy packet loss. That is, the prior art mixed sharing mode buffer allocation cannot raise the effectiveness of buffer of the high network port density packet switch.

SUMMARY OF THE INVENTION

It is therefore a primary objective of the claimed invention to provide a buffer space allocation method and related packet switch for dynamically performing space allocation.

The present invention discloses a buffer space allocation method for a packet switch including periodically performing a measurement process to obtain a plurality of measurement results at different times, each measurement result indicating a total size of accumulated packets in an output queue corresponding to one of a plurality of network ports of the packet switch and adjusting a dedicated buffer space of the output queue according to the plurality of measurement results and a reserved space value for the dedicated buffer space.

The present invention further discloses a packet switch including a plurality of network ports, each of the plurality of network ports corresponding to at least an output queue, a buffer memory, coupled to the plurality of network ports, for storing packets in the at least one output queue corresponding to each of the plurality of network ports, a plurality of queue measurement units, each of the plurality of queue measurement units coupled to a corresponding one of the plurality of network ports, for periodically performing a measurement process to measure the total size of packets in an output queue of the network port, to generate a plurality of measurement results, and a buffer management unit, coupled to the plurality of network ports, the buffer memory, and the plurality of queue measurement units, for adjusting a dedicated buffer space of the output queue according to the plurality of measurement results and a reserved space value for the dedicated buffer space.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
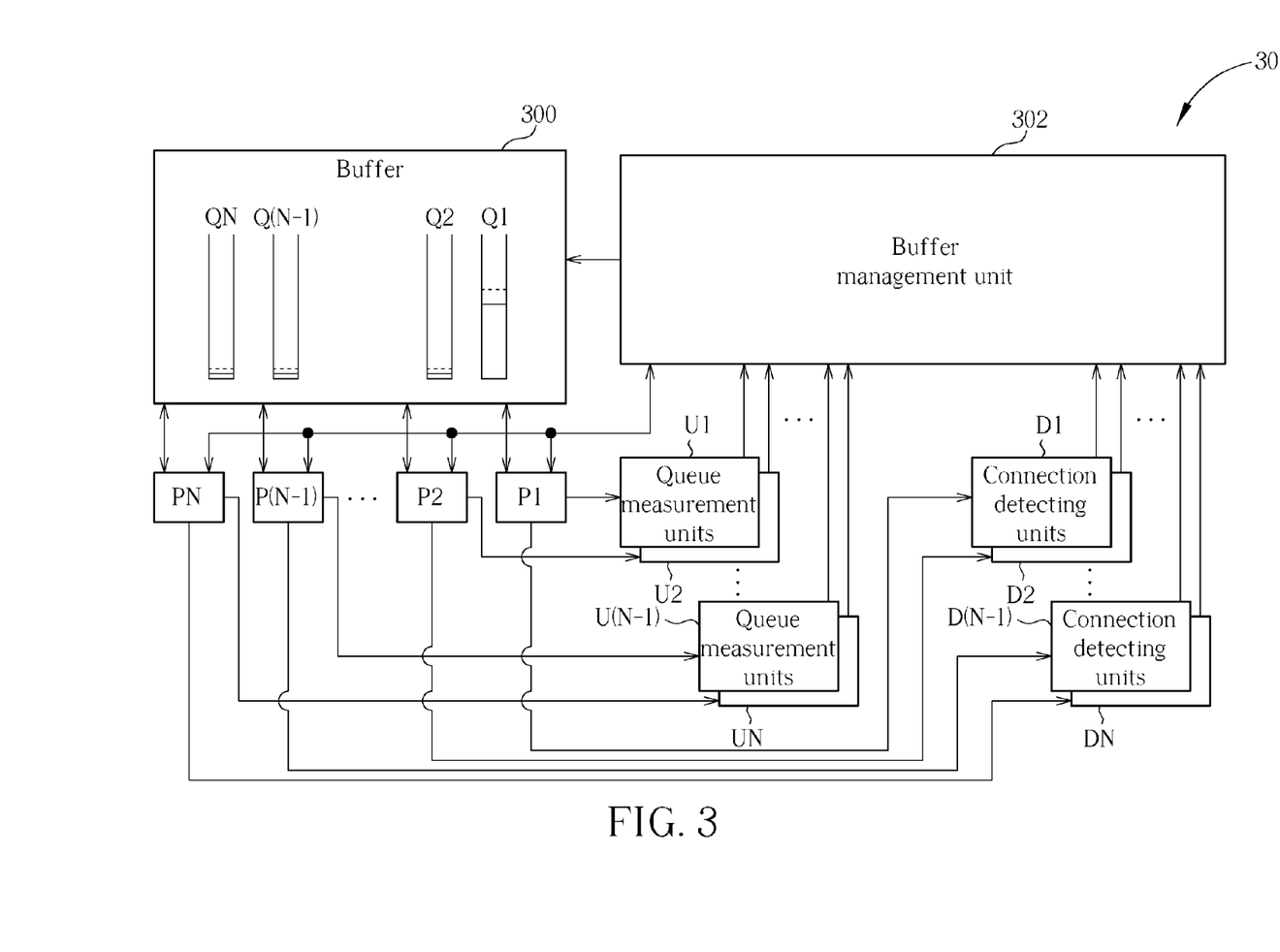
FIG. 3 and FIG. 4 are schematic diagrams of a packet switch according to an embodiment of the present invention.

Please refer to FIG. 3. FIG. 3 is a schematic diagram of a packet switch 30 according to an embodiment of the present invention. The packet switch 30 is a shared-buffer output queued switch, coupled between a plurality of transmitters and a plurality of receivers, for performing traffic management of packets outputted from the transmitters to deliver the packets to the corresponding receivers. The packet switch 30 comprises a buffer 300, a buffer management unit 302, network ports P1-PN, queue measurement units U1-UN, and connection detecting units D1-DN. The network ports P1-PN are bidirectional input/output ports, and corresponding to which displaced output queues Q1-QN. The buffer 300 is coupled to the network ports P1-PN, for temporary storing the packets in the output queues Q1-QN. The buffer management unit 302 is coupled to the network ports P1-PN, the buffer 300, the queue measurement units U1-UN and the connection detecting units D1-DN. The buffer management unit 302 receives a buffer resources request signal through an input port, and assigns available memory resources in the buffer 300 accordingly to the output queues of the output ports to temporary store the packets outputted from the transmitter. Each of the queue measurement units U1-UN is coupled to the buffer management unit 302 and a corresponding network port of the network ports P1-PN. Each of the connection detecting units D1-DN is coupled to the buffer management unit 302, a corresponding one of the network ports P1-PN, and a corresponding one of the queue measurement units U1-UN.

Figure 4:
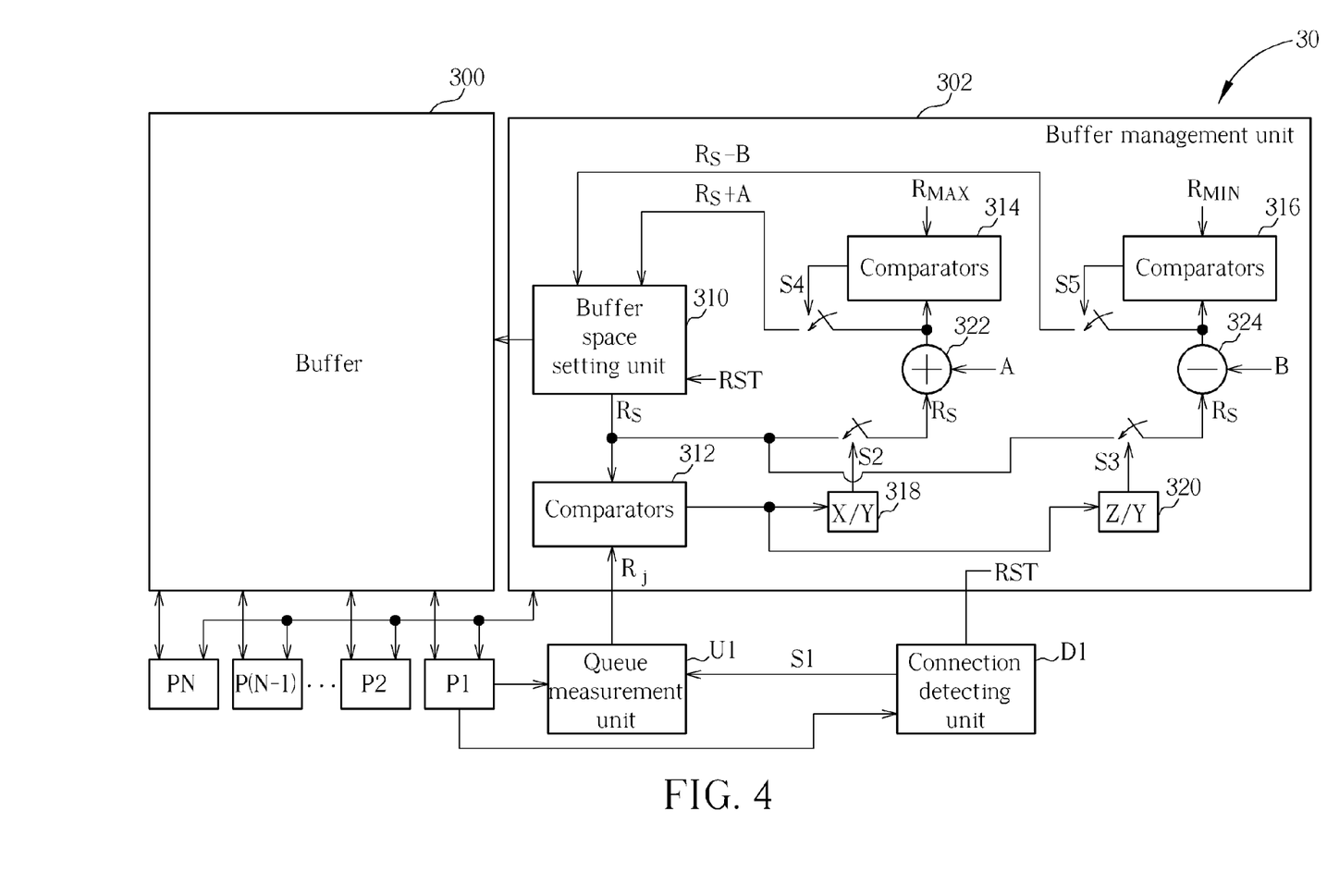

Please first note herein, compare to the packet switch 20 in FIG. 2, the packet switch 30 in FIG. 3 has two primary disparities. First, the queue measurement units U1-UN and the connection detecting units D1-DN are added in the packet switch 30. Second, the buffer management unit 302, as illustrated in FIG. 4, is capable of dynamically adjusting each dedicated buffer space of the output queues Q1-QN according to the data outputted from the queue measurement units U1-UN and the connection detecting units D1-DN, so as to utilize the buffer 300 most efficiently. In the packet switch 30, an output queue is disposed for each network port. It is merely an embodiment of the present invention; in other embodiments of the present invention, a plurality of output queues of different priorities can be disposed for each network port. In the packet switch 30, each queue measurement unit performs the same processes, and each connection detecting unit also performs the same processes; the figures and descriptions thereof merely depict the operations of the queue measurement unit U1, the connection detecting unit D1, and the buffer management unit 302, while the operations of the other queue measurement units and the other connection detecting units can be derived accordingly.

Please refer to FIG. 4. FIG. 4 is also a schematic diagram of the packet switch 30, wherein the compositions and functions of the buffer management unit 302, the queue measurement unit U1 and the connection detecting unit D1 are detailed described. The buffer management unit 302 comprises a buffer space setting unit 310, comparators 312, 314, and 316, determination units 318 and 320, an adder 322, and a subtracter 324. The queue measurement unit U1 is coupled to the network port P1, the connection detecting unit D1, and the comparator 312, for periodically performing the output queue measurement process; in other words, within a duration, the queue measurement unit U1 performs multiple times of output queue measurement processes that measure the total size of accumulated packets in the output queue Q1 of the network port P1 to obtain measurement results corresponding to different measurement timing, and outputs the measurement results to the comparator 312. The connection detecting unit D1 is coupled to the network port P1, the queue measurement unit U1, and the buffer space setting unit 326, for detecting the network connection status before each time the queue measurement unit U1 performing the output queue measurement process to generate a control signal S1. When the network connection status indicates that the network port P1 is unlinked, that is, when the network port P1 is not in use, the control signal S1 controls the queue measurement unit U1 not to perform the output queue measurement process. In the meanwhile, the connection detecting unit D1 transmits a reset signal RST to the buffer space setting unit 310 in order to set the dedicated buffer space for the network port P1 zero through the buffer space setting unit 310. Therefore, the buffer 300 reserves no buffer space for network port not in use. On the other hand, when the network connection status indicates that the network port P1 is linked, the control signal S1 starts the queue measurement unit U1, enabling the queue measurement units U1 to perform the output queue measurement process.

The operation of the buffer management unit 302, in brief, is adjusting the dedicated buffer space for output queue Q1 according to the measurement result generated by the queue measurement unit U1. It is detailed described herein. The buffer space setting unit 310 is coupled to the buffer 300, for setting the dedicated buffer space for the output queue Q1 to a reserved space value $R_S$ and transmitting the reserved space value $R_S$ to the comparator 312 at the same time. The comparator 312 is coupled to the queue measurement unit U1, the determination unit 318 and the determination unit 320, for comparing a measurement result $R_j$ with the reserved space value $R_S$ to generate comparison results while each time receiving the measurement result $R_j$ from the queue measurement unit U1. The determination unit 318 is utilized for accumulating the comparison result generated by the comparator 312, and for determining whether each of at least X comparison results among Y continuous comparison results indicates that the measurement result $R_j$ is larger than or equal to the reserved space value $R_S$, and generating a control signal S2 accordingly to control the connection between the buffer space setting unit 310 and the adder 322. When the determination unit 318 determines that each of at least X comparison results among Y continuous comparison results indicates that the measurement result $R_j$ is larger than or equal to the reserved space value $R_S$, that is, the ratio of the number of the measurement result $R_j$ larger than or equal to the reserved space value $R_S$ to the number of total measurement results is larger than or equal to X/Y, indicating that the dedicated buffer space for the output queue Q1 is not sufficient. In the meanwhile, the control signal S2 controls the connection between the buffer space setting unit 310 and the adder 322 to be on, so that the reserved space value $R_S$ is outputted to the adder 322.

Similarly, the determination unit 320 is utilized for accumulating the comparison results generated by the comparator 312, and for determining whether each of at least Z comparison results among continuous Y comparison results indicates that the measurement result $R_j$ is smaller than the reserved space value $R_S$, and generating a control signal S3 accordingly to control the connection between the buffer space setting unit 310 and the subtracter 324. When the determination unit 320 determines that each of at least Z comparison results among Y continuous comparison results indicates that the measurement result $R_j$ is smaller than the reserved space value $R_S$, that is, the ratio of the number of the measurement result $R_j$ smaller than the reserved space value $R_S$ to the number of total measurement results is larger than or equal to Z/Y, indicating that the dedicated buffer space for the output queue Q1 is sufficient but not necessary. In the meanwhile, the control signal S3 controls the connection between the buffer space setting unit 310 and the subtracter 324 to be on, so that the reserved space value $R_S$ is outputted to the subtracter 324. Please note that while the number of accumulated comparison results is mounted to Y, the ratio X/Y and Z/Y used by the determination unit 318 and the determination unit 320 may both be reached, in the meanwhile, the reserved space value $R_S$ is outputted to both the adder 322 and the subtracter 324.

It is shown that the determination unit 318 and the determination unit 320 control the following operations on the reserved space value $R_S$ based on whether the specific ratio (X/Y or Z/Y) are reached or not. Since the following operations correlate to the adjustment of the dedicated buffer space reserved for the output queue Q1, the present invention is further designed for allowing the determination unit 318 and the determination unit 320 to determine periodically or timely whether the ratio is reached or not, so as to determine the frequencies for adjusting the dedicated buffer space reserved for the output queue Q1. One of embodiments is as following. When the queue measurement unit U1 performs the output queue measurement process up to Y times, and the determination unit 318 and the determination unit 320 perform the determination of the ratio X/Y and Z/Y respectively, Despite of the results of determinations, the determination unit 318 and the determination unit 320 reset the number of received comparison results zero to accumulate the comparison result from the beginning. For example, assume the ratio X/Y used by the determination unit 318 is 20/100 and the ratio Z/Y used by the determination unit 320 is 90/100, the queue measurement unit U1 periodically performs the output queue measurement process for 100 times, the comparator 312 generates 100 comparison results accordingly, and there are 10 comparison results indicating that the measurement result $R_j$ is larger than or equal to the reserved space value $R_S$. Based on the above assumption, the determination unit 318 determines that the ratio 20/100 has not reached, meanwhile, the control signal S2 generated by the determination unit 318 controls the connection between the buffer space setting unit 310 and the adder 322 to be off; on the contrary, the determination unit 320 determines that the ratio 90/100 has reached, the control signal S3 generated by the determination unit 320 controls the connection between the buffer space setting unit 310 and the subtracter 324 to be on. Later, the determination unit 318 and the determination unit 320 again perform the determination when 100 comparison results are re-accumulated.

Another embodiment is as following. When the queue measurement unit U1 has performed the output queue measurement process up to Y times, that is, when the determination unit 318 has received Y comparison results, the determination unit 318 determines whether the ratio X/Y is reached or not, and when the measurement unit U1 is performing the output queue measurement process for the $(Y+1)^{th}$, $(Y+2)^{th}$, . . . times, each time when receiving a corresponding comparison result, the determination unit 318 determines whether each of X comparison results among the previous Y comparison results indicates that the measurement result $R_j$ is larger than or equal to the reserved space value $R_S$. For example, when the queue measurement unit U1 performs the output queue measurement process for the 110 time, the determination unit 318 determines whether the ratio 20/100 is reached according to the comparison results corresponding to the $11^{th}$ to the $110^{th}$ times of the output queue measurement process. In other words, when the number of times of the output queue measurement processes is larger than or equal to Y, each time when the output queue measurement process is performed, the determination unit 318 determines whether the ratio X/Y is reached or not. Likewise, after the number of times of the output queue measurement processes is larger than or equal to Y, each time when the measurement process is performed, the determination unit 320 determines whether the ratio Z/Y is reached or not. In this embodiment, every time when the output queue measurement process is performed, the determination unit 318 and the determination unit 320 perform the determination according to a fixed number of previous comparison results. The number of the accumulated comparison results will not be reset to zero, but the determination unit 318 and the determination unit 320 replace the earliest comparison result with the latest comparison result while each time receiving the latest comparison result.

The adder 322 is coupled to the comparator 314, and the subtracter 324 is coupled to the comparator 316. When receiving the reserved space value $R_S$, the adder 322 adds an increment A to the reserved space value $R_S$, and outputs the addition result $R_S+A$ to the comparator 314. The increment A indicates the size of buffer space to be increased. The comparator 314 compares the addition result $R_S+A$ with a maximum value $R_{MAX}$, and generates a control signal S4 according to the comparison result. The maximum value $R_{MAX}$ indicates the maximum buffer size allocated to the dedicated buffer space for the output queue Q1 within the buffer 300, and the control signal S4 is utilized for controlling the connection between the adder 322 and the buffer space setting unit 310. When the comparator 314 performs the comparison and acquires that $(R_S+A)<R_{MAX}$, which indicates that the dedicated buffer space for the output queue Q1 still has room for upward adjustment; in the meanwhile, the control signal S4 controls the connection between the adder 322 and the buffer space setting unit 310 to be on, and the adder 322 transmits the addition result $R_S+A$ to the buffer space setting unit 310. In addition, when the comparator 314 acquires that $(R_S+A) \geq R_{MAX}$, which indicates the dedicated buffer space for the output queue Q1 cannot be increased; in the meanwhile, the control signal S4 controls the connection between the adder 322 and the buffer space setting unit 310 to be off, and the buffer space setting unit 310 will not adjust the dedicated buffer space for the output queue Q1.

Similarly, when receiving the reserved space value $R_S$, the subtracter 324 subtracts a decrement B from the reserved space value $R_S$, and outputs the subtraction result $R_S-B$ to the comparator 316. The decrement B indicates the size of buffer space to be reduced. The comparator 316 compares the subtraction result $R_S-B$ with a minimum value $R_{MIN}$, and generates a control signal S5 according to the comparison result. The minimum value $R_{MIN}$ indicates the minimum buffer size allocated to the dedicated buffer space for the output queue Q1 within the buffer 300, while the control signal S5 is utilized for controlling the status of the connection between the subtracter 324 and the buffer space setting unit 310. When the comparator 316 performs the comparison and acquires that $(R_S-B)>R_{MIN}$, which indicates that the dedicated buffer space for the output queue Q1 still has room for downward adjustment; in the meanwhile, the control signal S5 controls the connection between the subtracter 324 and the buffer space setting unit 310 to be on, and the subtracter 324 transmits the subtraction result $R_S-B$ to the buffer space setting unit 310. In addition, when the comparator 316 acquires that $(R_S-B) \leqq R_{MIN}$, which indicates the dedicated buffer space for the output queue Q1 cannot be reduced; in the meanwhile, the control signal S5 controls the connection between the subtracter 324 and the buffer space setting unit 310 to be off, and the buffer space setting unit 310 will not adjust the dedicated buffer space for the output queue Q1. What should be noticed is that the above increment A or decrement B is not limited to a specific value. It can be a fixed number or a time variable. With the increase of the adjusting number of times of the buffer space, the buffer space to be increased or reduced is decreasing, and inclines to fine-tuning.

According to the above operations of the units, the information of buffer space size received by the buffer space setting unit 310 may be $R_S+A$ or $R_S-B$, or both of $R_S+A$ and $R_S-B$ when the ratios X/Y and Z/Y are reached at the same time and the buffer have both room for upward and downward adjustment. If the buffer space setting unit 310 only receives $R_S+A$ or $R_S-B$, the buffer space setting unit 310 adjusts the original size of the dedicated buffer space for the output queue Q1, i.e. the reserved space value $R_S$, upward to $R_S+A$ or downward to $R_S-B$; on the other hand, if the buffer space setting unit 310 receives both $R_S+A$ and $R_S-B$ at the same time, the buffer space setting unit 310 selectively adjusts the reserved space value $R_S$ upward to $R_S+A$, or downward to $R_S-B$, or maintain the reserved space value $R_S$ without adjustment. Thereof, the size of the dedicated buffer space for the output queue Q1 is not always a fixed value, but dependent on the number of packets in the output queue Q1 since the frequency that the number of packets in the output queue Q1 is excessive is extremely high, the network port P1 corresponds to the output queue Q1 may be a hot spot, and theoretically a larger dedicated buffer space should be allocated for the output queue Q1. On the other hand, if the number of packets in the output queue Q1 is always few, the dedicated buffer space for the output queue Q1 can be reduced to save the buffer space for the hot spot exclusively, or common to all output queues. Therefore, the dedicated buffer space for the output queue Q1 in buffer 300 can be adjusted dynamically to avoid the long-time insufficiency of the dedicated buffer space, and hence avoid the packet loss in transmission of the packet in the output queue Q1.

The above descriptions are the operations between the queue measurement unit U1, the connection detecting unit D1, and the buffer management unit 302 in the packet switch 30, while the operations of other queue measurement units and the connection detecting units can also be derived thereof. In brief, the connection detecting units D1-DN periodically detect the network connection status of the network ports P1-PN, and control the queue measurement units U1-UN accordingly, such that the queue measurement units U1-UN can periodically measure the total size of packets in each of output queues corresponding to the network ports P1-PN; the buffer management unit 302 dynamically increases or reduces the buffer space allocation corresponding to the network ports or the output queues through the operation of each units according to the measurement results obtained by the queue measurement units U1-UN. In addition, in a variation embodiment of the packet switch 30, it may include only the related units for increasing the buffer space, such as the determination unit 318, the adder 322, and the comparator 314, or include only the related units for reducing the buffer space, such as the determination unit 320, the subtracter 324, and the comparator 316.

Figure 5:
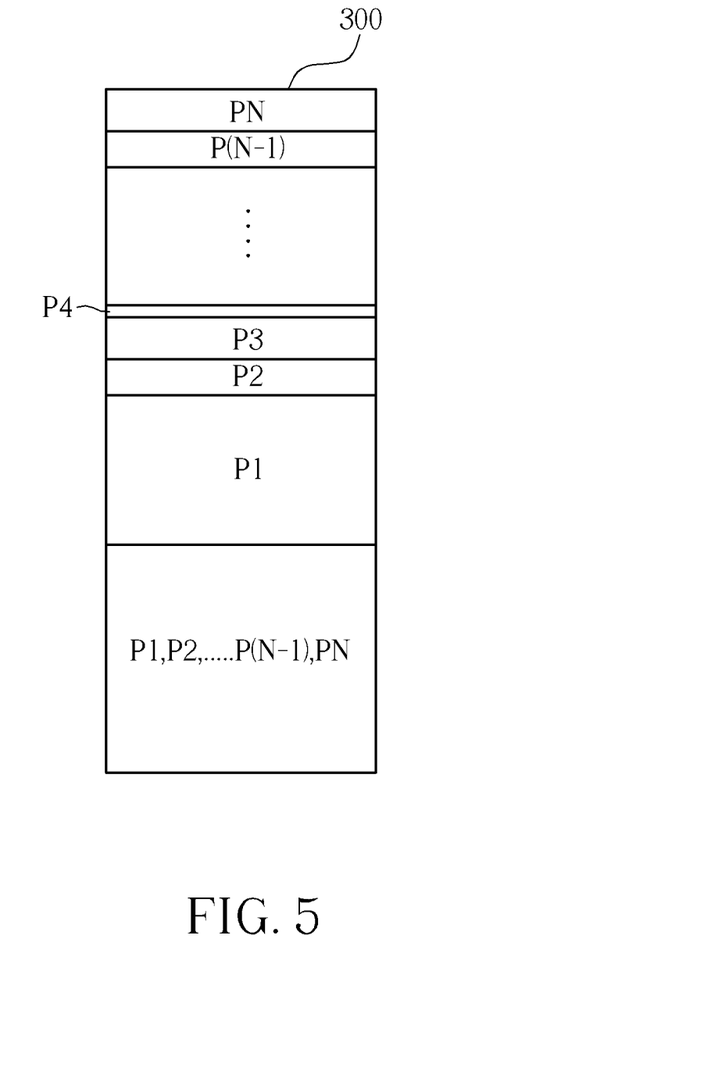
FIG. 5 is a diagram of a resources allocation of the buffer in the packet switch Shown in FIG. 3.

Please refer to FIG. 5. FIG. 5 is a diagram of a resources allocation of the buffer 300 in the packet switch 30, which indicates a possible allocation status of the buffer 300 at a certain time, wherein the network port P1 is assumed to be a hot spot. Compared to the buffer allocation in FIG. 1C, it is shown by FIG. 5 that through the operations of the buffer management unit 302, the queue measurement units U1-UN, and the connection detecting units D1-DN of the packet switch 30, the buffer 300 can reach the best effectiveness and offer the largest dedicated buffer space for the network port P1. Therefore, when there are abruptly an excessive number of packets waiting to be transmitted in the output queue corresponding to the network port P1, these packets are less possible to be lost due to the insufficiency of the dedicated buffer space, and hence the quality of transmission is increased enormously. Pleas note that the buffer 300 illustrated in FIG. 5 uses a network port as a unit to allocate the buffer space. If each of the network ports P1-PN of the packet switch 30 is divided into a plurality of output queues, the buffer 300 can also use an output queue as a unit to allocate the buffer space.

Figure 6:
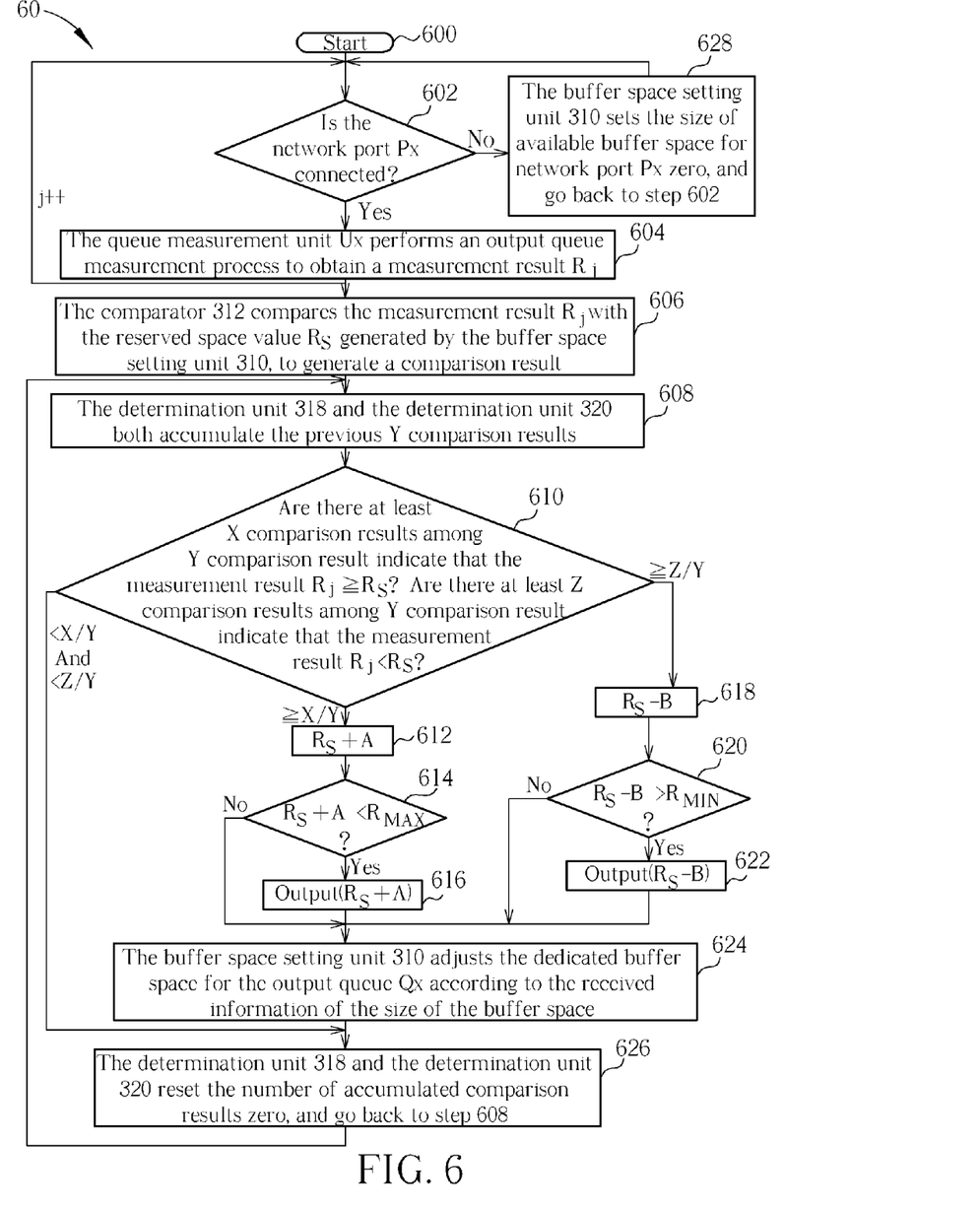
FIG. 6 is a flowchart of a process according to an embodiment of the present invention.

The above packet switch 30 may operate based on multiple different processes. Please refer to FIG. 6. FIG. 6 is a flowchart of a process 60 according to an embodiment of the present invention. The process 60 is the operating process of the buffer management unit 302, the queue measurement unit $U_x$ among the queue measurement units U1-UN, the connection detecting unit $D_x$ among the connection detecting units D1-DN and a network port $P_x$ corresponded. The process 60 is utilized for each queue measurement unit and each connection detecting unit, to allocate the buffer space of the buffer 300. The process 60 comprises the following steps:

Step 600: Start.

Step 602: The connection detecting unit $D_x$ detects the network connection status of the network port $P_x$. If the network connection status indicates that the network port $P_x$ is unlinked, perform step 628; if the network connection status indicates that the network port $P_x$ is linked, perform step 604.

Step 604: The queue measurement unit $U_x$ performs an output queue measurement process to obtain a measurement result $R_j$.

Step 606: The comparator 312 compares the measurement result $R_j$ with the reserved space value $R_S$ generated by the buffer space setting unit 310, to generate a comparison result.

Step 608: The determination unit 318 and the determination unit 320 both accumulate the previous Y comparison results.

Step 610: The determination unit 318 determines whether each of at least X comparison results among Y comparison result indicates that the measurement result $R_j$ is larger than or equal to the reserved space value $R_S$, meanwhile, the determination unit 320 determines whether each of at least Z comparison results among Y comparison result indicates that the measurement result $R_j$ is smaller than the reserved space value $R_S$. If the ratio X/Y is reached, perform step 612; if the ratio Z/Y is reached, perform step 618; if both of the ratios X/Y and Z/Y are not reached, perform step 626.

Step 612: The adder 322 adds an increment A to the reserved space value $R_S$.

Step 614: The comparator 314 compares ($R_S$+A) with the maximum value $R_{MAX}$. If ($R_S$+A)<$R_{MAX}$, perform step 616; if ($R_S$+A)$\geq R_{MAX}$, perform step 624.

Step 616: ($R_S$+A) is outputted to the buffer space setting unit 310.

Step 618: The subtracter 324 subtracts the reserved space value $R_S$ from a decrement B.

Step 620: The comparator 316 compares ($R_S$−B) with the minimum value $R_{MIN}$. If ($R_S$−B)>$R_{MIN}$, perform step 622; if ($R_S$−B)$\leq R_{MIN}$, perform step 624.

Step 622: ($R_S$−B) is outputted to the buffer space setting unit 310.

Step 624: The buffer space setting unit 310 adjusts the dedicated buffer space for the output queue $Q_x$ according to the received information of the size of the buffer space.

Step 626: The determination unit 318 and the determination unit 320 reset the number of accumulated comparison results zero, and go back to step 608.

Step 628: The buffer space setting unit 310 sets the size of available buffer space for network port $P_x$ zero, and go back to step 602.

The operation of each steps in the process 60 has been detailed described in the above packet switch 30, and is not narrated herein. In the process 60, when the buffer space setting unit 310 finishes the adjustment of the buffer space, or the determination unit 318 and the determination unit 320 determine that both of the ratios X/Y and Z/Y are not reached, the determination unit 318 and the determination unit 320 reset the number of the accumulated comparison results zero, and go back to step 608, waiting to perform the determination again after the sufficient number of comparison results is re-accumulated.

Figure 7:
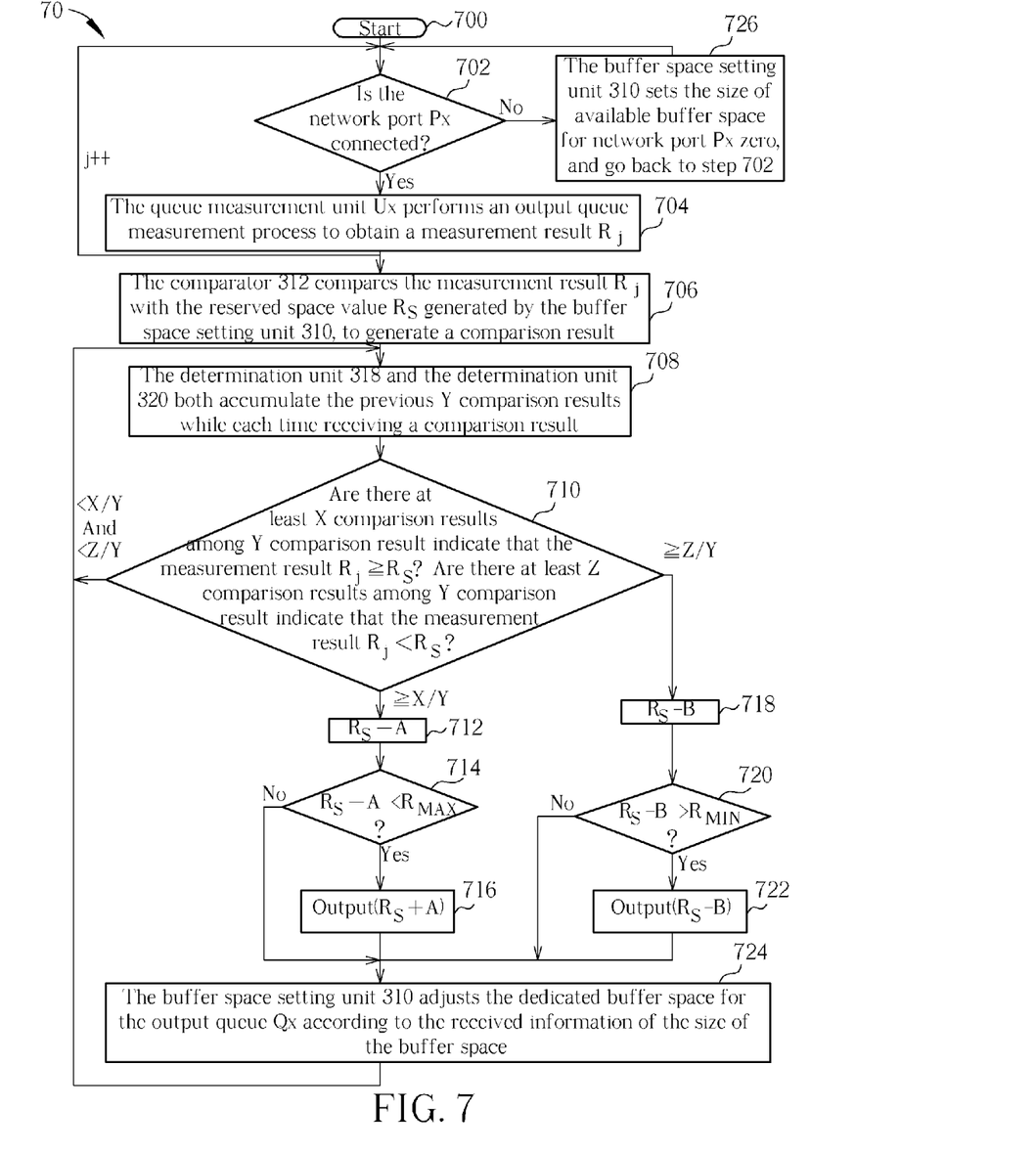
FIG. 7 is a flowchart of a process according to an embodiment of the present invention.

It can be shown from the above packet switch 30 that the operations of the determination unit 320 and that of the determination unit 318 are slightly different. Please refer to FIG. 7. FIG. 7 is a flowchart of a process 70 according to an embodiment of the present invention. The process 70 is also utilized for each queue measurement units and each connection detecting units of the packet switch 30 to allocate the buffer space of the buffer 300. The process 70 comprises the following steps:

Step 700: Start.

Step 702: The connection detecting unit $D_x$ detects the network connection status of the network port $P_x$. If the network connection status indicates that the network port $P_x$ is unlinked, perform step 726; if the network connection status indicates that the network port $P_x$ is linked, perform step 704.

Step 704: The queue measurement unit $U_x$ performs an output queue measurement process to obtain a measurement result $R_j$.

Step 706: The comparator 312 compares the measurement result $R_j$ with the reserved space value $R_S$ generated by the buffer space setting unit 310, to generate a comparison result.

Step 708: The determination unit 318 and the determination unit 320 both accumulate the previous Y comparison results while each time receiving a comparison result.

Step 710: The determination unit 318 determines whether each of at least X comparison results among Y comparison result indicates that the measurement result $R_j$ is larger than or equal to the reserved space value $R_S$, meanwhile, the determination unit 320 determines whether each of at least Z comparison results among Y comparison result indicates that the measurement result $R_j$ is smaller than the reserved space value $R_S$. If the ratio X/Y is reached, perform step 712; if the ratio Z/Y is reached, perform step 718; if both of the ratios X/Y and Z/Y are not reached, perform step 708.

Step 712: The adder 322 adds an increment A to the reserved space value $R_S$.

Step 714: The comparator 314 compares ($R_S$+A) with the maximum+value $R_{MAX}$. If ($R_S$+A)<$R_{MAX}$, perform step 716; if ($R_S$+A)$\geq R_{MAX}$, perform step 724.

Step 716: ($R_S$+A) is outputted to the buffer space setting unit 310.

Step 718: The subtracter 324 subtracts the reserved space value $R_S$ from a decrement B.

Step 720: The comparator 316 compares ($R_S$−B) with the minimum value $R_{MIN}$. If ($R_S$−B)>$R_{MIN}$, perform step 722; if ($R_S$−B)$\leq R_{MIN}$, perform step 724.

Step 722: ($R_S$−B) is outputted to the buffer space setting unit 310.

Step 724: The buffer space setting unit 310 adjusts the dedicated buffer space for the output queue $Q_x$ according to the received information of the size of the buffer space.

Step 726: The buffer space setting unit 310 sets the size of available buffer space for network port $P_x$ zero, and go back to step 702.

In the process 70, step 708 and step 710 are different from the step 608 and step 610 in the process 60 respectively. According to the process 70, the determination unit 318 and the determination unit 320 determine whether the predetermined ratios are reached after receiving the comparison results up to Y times, and each time when receiving the comparison result thereafter. Even if the predetermined ratios are not reached, the determination unit 318 and the determination unit 320 do not reset the number of the accumulated comparison results zero, but replace the earliest comparison result with the latest comparison result while receiving each latest comparison result to control the number of the comparison results for determinations to a fixed number. The operations of each step in the process 70 have been described in the above packet switch 30, and are not narrated herein. Compared to the process 60, the process 70 is capable of timely adjusting the buffer space of the output queue, instead of waiting for a longer duration to collect the comparison results.

The packet switch 30, the process 60 and the process 70 are preferable embodiments of the present invention and those skilled can make variations and modifications accordingly, for example, the ratios used for determining whether to adjust the buffer space are not limited to fixed proportions, but can be changed with time. For example, after receiving 100 comparison results, the determination unit 318 determines whether to adjust the size of buffer space based on whether each of the at least 20 comparison results among these 100 comparison results indicates that the measurement result $R_j$ is larger than or equal to the reserved space value $R_S$; next, after receiving 20 comparison results, the determination unit 318 may promptly determines whether each of the at least 10 comparison results among these 20 comparison results indicates that the measurement result $R_j$ is larger than or equal to than the reserved space value $R_S$. Therefore, when there are abruptly an excessive number of packets in parts of the output queues, the dedicated buffer space for the output queues can be adjusted more swiftly.

Figure 8:
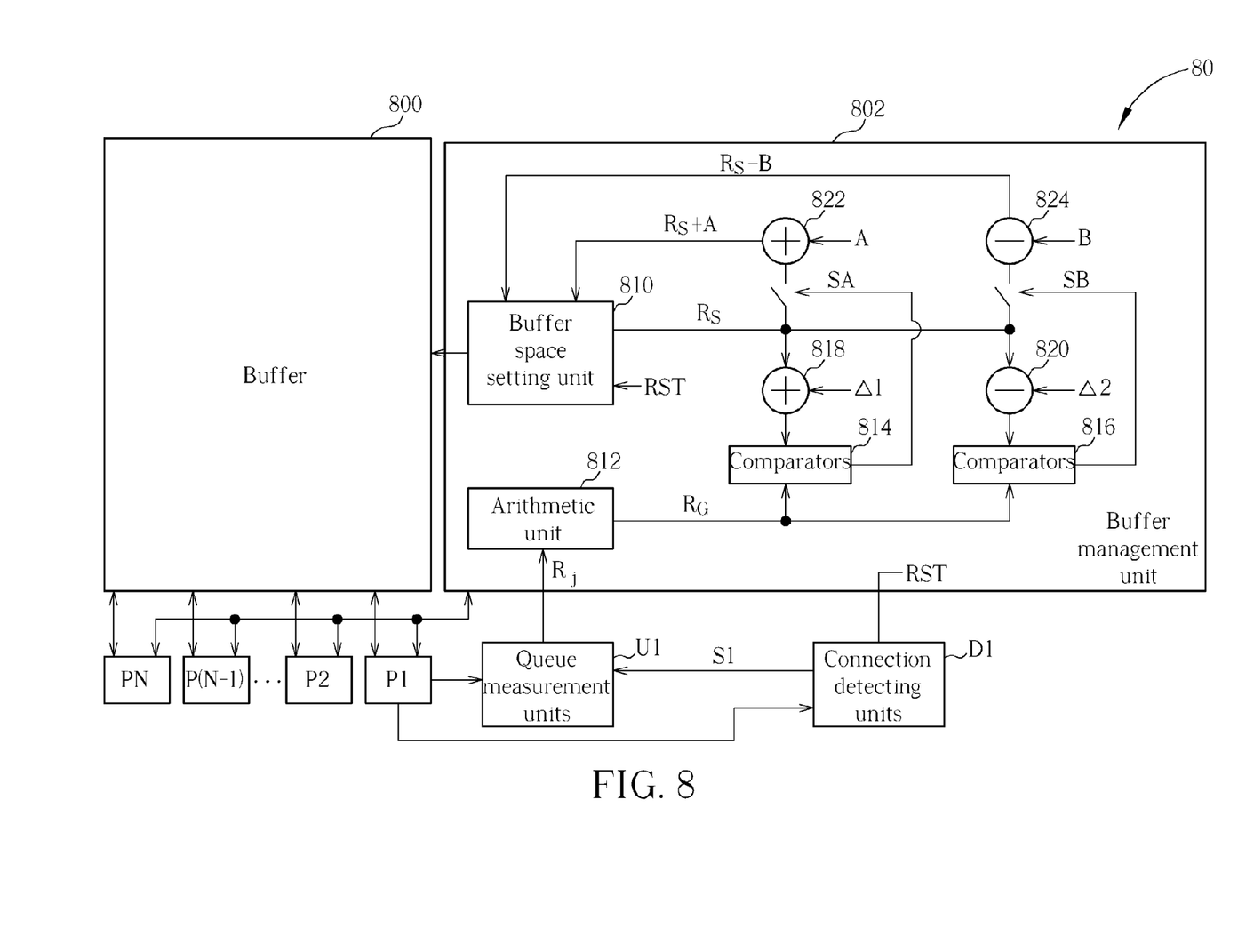
FIG. 8 is a schematic diagram of a packet switch according to an embodiment of the present invention.

Please note that the key point of the packet switch 30 and the related processes is that the packet switch 30 and the related processes are capable of calculating within a duration the number of times that the total size of packets in an output queue exceeds the available buffer size for the output queue and adjusting the dedicated buffer space of each output queues accordingly. The present invention further discloses another packet switch, such as a packet switch 80 in FIG. 8, which is capable of adjusting the dedicated buffer space of the output queue according to the average value of the total size of accumulated packets in the output queue within a duration. The packet switch 80 comprises a buffer 800, a buffer management unit 802, network ports P1-PN, queue measurement units U1-UN, and connection detecting units D1-DN, wherein only the queue measurement unit U1 and the connection detecting unit D1 are shown in FIG. 8 for the sake of convenience of description. The buffer management unit 802 comprises a buffer space setting unit 810, an arithmetic unit 812, comparators 814 and 816, adders 818 and 822, and subtracters 820 and 824. The operations of the queue measurement units U1-UN and the connection detecting units D1-DN are identical to that of the corresponding units in packet switch 30, and are not narrated herein.

The queue measurement unit U1 periodically measures the total size of the accumulated packets in the output queue Q1 of the network port P1, and outputs the measurement result to the arithmetic unit 812. The arithmetic unit 812 calculates an average value of packet sizes $R_G=(R_1+R_2+\ldots+R_N)/N$ after receiving N measurement results $R_1$-$R_N$, and outputs the average value to the comparators 814 and 816. Meanwhile, the buffer space setting unit 810 outputs the reserved space value $R_S$ which is reserved for the output queue Q1 to the adder 818 and the subtracter 820. The adder 818 adds a differential $\Delta 1$ to the reserved space value $R_S$, the subtracter 820 subtracts a differential $\Delta 2$ from the reserved space value $R_S$, and output the arithmetic results to the comparator 814 and the comparator 816 respectively.

The comparator 814 compares the average value of the packets $R_G$ with the arithmetic result of the adder 818, $R_S+\Delta 1$, and generates a control signal SA for controlling the status of the connection between the buffer space setting unit 810 and the adder 822. If the comparator 814 performs comparison and acquires that the average value of the packets $R_G>R_S+\Delta 1$, that is, the average value of the packets $R_G$ is larger than the reserved space value $R_S$ for more than $\Delta 1$, indicating that the size of the packet transmitting is such large that it is necessary to adjust the reserved space value. In the meanwhile, the control signal SA controls the connection between the buffer space setting unit 810 and the adder 822 to be on, and the adder 822 adds an increment A to the reserved space value $R_S$ and outputs ($R_S+A$) to the buffer space setting unit 810. If the comparator 814 performs comparison and acquires that the average value of the packets $R_G \leqq R_S+\Delta 1$, the control signal SA controls the connection between the buffer space setting unit 810 and the adder 822 to be off, and the buffer space setting unit 810 will not receive the arithmetic result generated by the adder 822.

The comparator 816 compares the average value of the packets $R_G$ with the arithmetic result of the subtracter 820, $R_S-\Delta 2$, and generates a control signal SB for controlling the status of the connection between the buffer space setting unit 810 and the subtracter 824. If the comparator 816 performs comparison and acquires that the average value of the packets $R_G<R_S-\Delta 2$, that is, the average value of the packets $R_G$ is smaller than the reserved space value $R_S$ for more than $\Delta 2$, indicating that the size of the packet transmitting is such small that it does not need the space size as large as the current reserved space value. In the meanwhile, the control signal SB controls the connection between the buffer space setting unit 810 and the subtracter 824 to be on, and the subtracter 824 subtracts a decrement B from the reserved space value $R_S$ and outputs ($R_S-B$) to the buffer space setting unit 810. If the comparator 816 performs comparison and acquires that the average value of the packets $R_G \geqq R_S-\Delta 2$, the control signal SB controls the connection between the buffer space setting unit 810 and the subtracter 824 to be off, and the buffer space setting unit 810 will not receive the arithmetic result generated by the subtracter 824.

In brief, when the average value of the packets $R_G>R_S+\Delta 1$ and $R_G<R_S-\Delta 2$, the buffer space setting unit 810 adjusts the reserved space value $R_S$ upward to $R_S+A$, or downward to $R_S-B$, according to the arithmetic results received. On the other hand, if the average value of the packets $R_G$ falls within the interval of $R_S-\Delta 2 \leqq R_G \leqq R_S+\Delta 1$, the buffer space setting unit 810 does not adjust the reserved space value.

Please note that the operation of the above arithmetic unit 812 receiving a fixed number of measurement results and calculating the average value has two different applications. One is each time when the arithmetic unit 812 receives N measurement results $R_1$-$R_N$ and calculates the average value of the packets $R_G$, the arithmetic unit 812 resets the number of packets zero, and re-calculates the average value after receiving the following N measurement results $R_{(N+1)}$-$R_{2N}$; the other is when the arithmetic unit 812 receives N measurement results and calculates the average value of the packets $R_G$, the arithmetic unit 812 does not reset the number of packets zero, but calculates the average value of the latest N measurement results when each time receiving one more measurement result, for example, while receiving the measurement result $R_{(N+1)}$, the arithmetic unit 812 calculates a new average value of the packets $R_G=(R_2+R_3+\ldots+R_{N+1})/N$.

Figure 9:
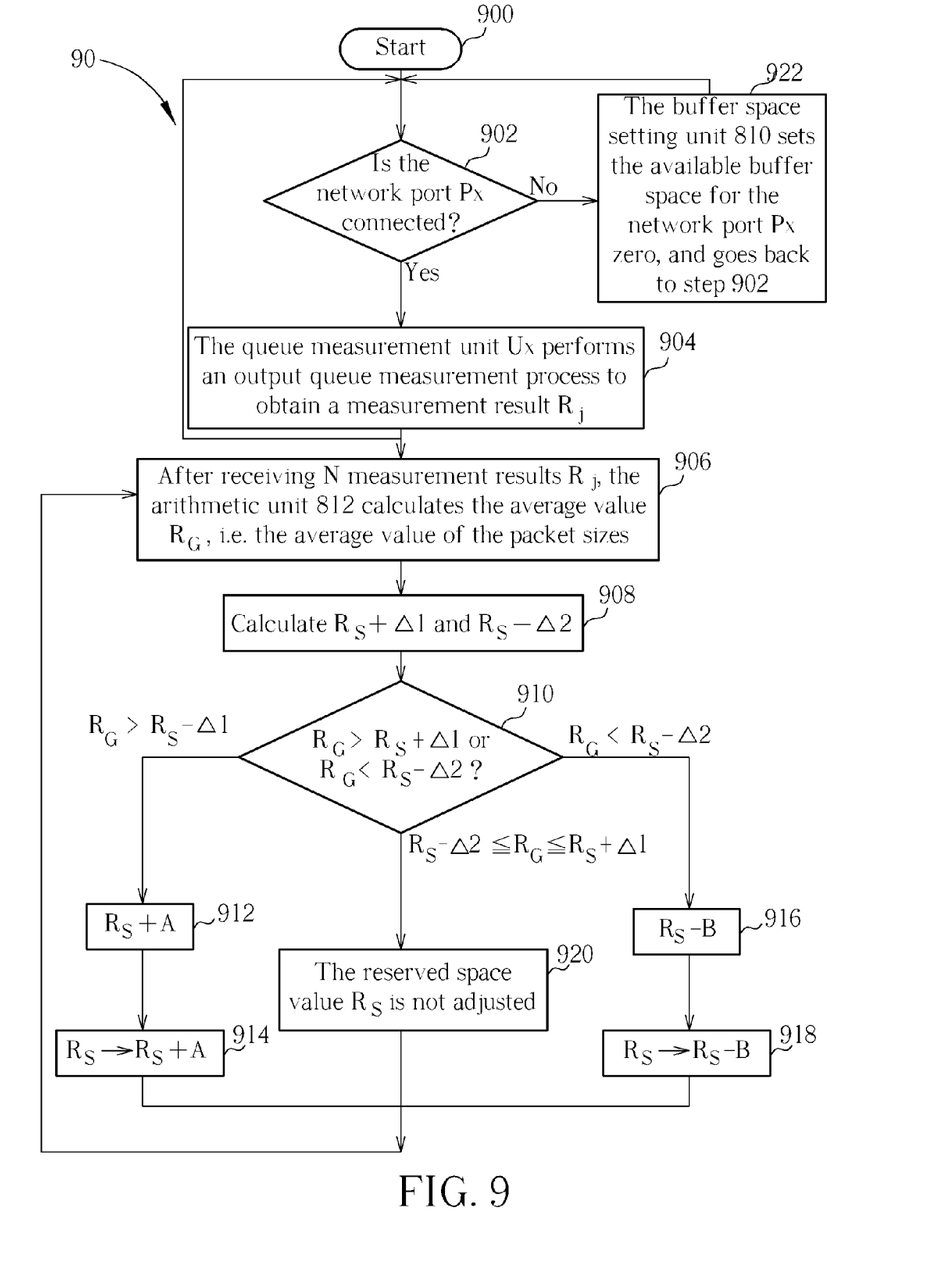
FIG. 9 is a flowchart of a process according to an embodiment of the present invention.

The operation of the packet switch 80 can be induced to a process 90 in FIG. 90. The process 90 comprises the following steps:

Step 900: Start.

Step 902: The connection detecting unit $D_x$ detects the network connection status of the network port $P_x$. If the network connection status indicates that the network port $P_x$ is unlinked, perform step 922; if the network connection status indicates that the network port $P_x$ is linked, perform step 904.

Step 904: The queue measurement unit $U_x$ performs an output queue measurement process to obtain a measurement result $R_j$.

Step 906: After receiving N measurement results $R_j$, the arithmetic unit 812 calculates the average value $R_G$, i.e. the average value of the packet sizes.

Step 908: The adder 818 adds a differential $\Delta 1$ to the reserved space value $R_S$, and outputs ($R_S+\Delta 1$) to the comparator 814; the subtracter 820 subtracts a differential $\Delta 2$ from the reserved space value $R_S$, and outputs ($R_S-\Delta 2$) to the comparator 816.

Step 910: The comparator 814 determines whether the average value of the packets $R_G>R_S+\Delta 1$, meanwhile, the comparator 816 determines whether the average value of the packets $R_G<R_S-\Delta 2$. If $R_G>R_S+\Delta 1$, perform step 912; if $R_G<R_S-\Delta 2$, perform step 916; if none of the above, perform step 920.

Step 912: The adder 822 adds an increment A to the reserved space value $R_S$.

Step 914: The buffer space setting unit 810 adjusts the reserved space value $R_S$ upward to $R_S+A$.

Step 916: The subtracter 824 subtracts a decrement B from the reserved space value $R_S$.

Step 918: The buffer space setting unit 810 adjusts the reserved space value $R_S$ downward to $R_S-B$.

Step 920: The buffer space setting unit 810 does not adjust the reserved space value $R_S$.

Step 922: The buffer space setting unit 810 sets the available buffer space for the network port $P_x$ zero, and goes back to step 902.

Please refer to the above description of the packet switch 80 for the detailed description of the operation of each steps in process 90, which is not narrated herein. The above packet switches 30 and 80, and the processes 60, 70, and 90 are merely parts of embodiments of the present invention, while in other embodiments, the connection detecting unit can be omitted from the packet switch. Under the circumstances, the dedicated buffer space for each buffer may not be best saved, but can also be dynamically increased or reduced, offering the largest available buffer space for the network port utilized as a hot spot, hence, the related steps of the connection detecting unit in the corresponding operating process can also be omitted.

To sum up, through the packet switch and the related processes of the present invention, all of the dedicated buffer spaces for the output queue of the network port in the packet switch can be adjust dynamically. Hence, the effectiveness can be optimized, providing larger dedicated buffer space for the output queues with more temporary stored packets, reducing the packet loss, and hence increasing the quality of transmission enormously.

Those skilled in the art will readily observe that numerous modifications and alterations of the device and method may be made while retaining the teachings of the invention.

What is claimed is:

1. A buffer space allocation method for a packet switch comprising:
   periodically performing a measurement process to obtain a plurality of measurement results at different times, each measurement result indicating a total size of accumulated packets in an output queue corresponding to one of a plurality of network ports of the packet switch; and
   adjusting a dedicated buffer space of the output queue according to the plurality of measurement results and a reserved space value for the dedicated buffer space;
   wherein the step of adjusting the dedicated buffer space of the output queue according to the plurality of measurement results and the reserved space value for the dedicated buffer space comprises:
   comparing each of the plurality of measurement results with the reserved space value, to generate a plurality of comparison results;
   accumulating a first number of comparison results; and
   performing at least one of adjusting steps, wherein the adjusting steps comprise:
   adjusting the dedicated buffer space of the output queue according to the sum of the reserved space value and an increment when each of at least a second number of comparison results among the first number of comparison results indicates that the measurement result is larger than or equal to the reserved space value and the sum of the reserved space value and the increment is smaller than a maximum value; or
   adjusting the dedicated buffer space of the output queue according to a difference between the reserved space value and a decrement when each of at least a second number of comparison results among the first number of comparison results indicates that the measurement result is smaller than the reserved space value and the difference between the measurement result and the decrement is larger than a minimum value; or
   resetting count of the accumulated comparison results when less than a second number of comparison results among the first number of comparison results indicate that the measurement result is smaller than the reserved space value; or
   accumulating one more comparison result when less than a second number of comparison results among the first number of comparison results indicate that the measurement result is smaller than the reserved space value; and adjusting the dedicated buffer space of the output queue according to the first number of previous comparison results.

2. The buffer space allocation method of claim 1, wherein the step of adjusting the dedicated buffer space of the output queue according to the plurality of measurement results and the reserved space value further comprises:
   maintaining the dedicated buffer space of the output queue when each of at least the second number of comparison results among the first number of comparison results indicates that the measurement result is larger than or equal to the reserved space value and the sum of the reserved space value and the increment is larger than or equal to the maximum value.

3. The buffer space allocation method of claim 1, wherein the step of adjusting the dedicated buffer space of the output queue according to the plurality of measurement results and the reserved space value further comprises:
   maintaining the dedicated buffer space of the output queue when each of at least the second number of comparison results among the first number of comparison results indicates that the measurement result is smaller than the reserved space value and the difference between the measurement result and the decrement is smaller than or equal to the minimum value.

4. A buffer space allocation method for a packet switch comprising:
   periodically performing a measurement process to obtain a plurality of measurement results at different times, each measurement result indicating a total size of accumulated packets in an output queue corresponding to one of a plurality of network ports of the packet switch; and
   adjusting a dedicated buffer space of the output queue according to the plurality of measurement results and a reserved space value for the dedicated buffer space;
   wherein the step of adjusting the dedicated buffer space of the output queue according to the plurality of measurement results and the reserved space value comprises:
   calculating an average value of a latest first number of measurement results of the plurality of measurement results;
   comparing the average value with a predetermined range that is from a difference value between the reserved space value and a first difference value to the sum of the reserve space value and a second difference value, to generate a comparison result; and
   adjusting the dedicated buffer space of the output queue according to the comparison result.

5. The buffer space allocation method of claim 4, wherein the step of adjusting the dedicated buffer space of the output queue according to the comparison result comprises:
   increasing the reserved space value when the average value is larger than the sum of the reserve space value and the second difference value.

6. The buffer space allocation method of claim 4, wherein the step of adjusting the dedicated buffer space of the output queue according to the comparison result comprises:
reducing the reserved space value when the average value is smaller than the difference value between the reserved space value and the first difference value.

7. The buffer space allocation method of claim 4, wherein the step of adjusting the dedicated buffer space of the output queue according to the comparison result comprises:
maintaining the reserved space value when the average value locates in the predetermined range.

8. A packet switch comprising:
a plurality of network ports, each of the plurality of network ports corresponding to at least one output queue;
a buffer memory, coupled to the plurality of network ports, for storing packets in the at least one output queue corresponding to each of the plurality of network ports;
a plurality of queue measurement units, each of the plurality of queue measurement units coupled to a corresponding one of the plurality of network ports, for periodically performing a measurement process to measure the total size of packets in an output queue of the network port, to generate a plurality of measurement results; and
a buffer management unit, coupled to the plurality of network ports, the buffer memory, and the plurality of queue measurement units, for adjusting a dedicated buffer space of the output queue according to the plurality of measurement results and a reserved space value for the dedicated buffer space;
wherein the buffer management unit comprises:
a buffer space setting unit, coupled to the buffer memory, for setting a reserved space value for the dedicated buffer space;
a first comparator, coupled to the plurality of queue measurement units and the buffer space setting unit, for comparing each of the plurality of the measurement results with the reserved space value to generate a plurality of comparison results;
a first determination unit, coupled to the first comparator, for determining whether each of at least a second number of comparison results among a first number of previous comparison results indicates that the measurement result is larger than or equal to the reserved space value, and generating a first control signal accordingly;
a second determination unit, coupled to the first comparator, for determining whether each of at least a third number of comparison results among the first number of comparison results indicates that the measurement result is smaller than the reserved space value, and generating a second control signal accordingly;
an adder, coupled to the first determination unit and the buffer space setting unit, for adding an increment to the reserved space value according to the first control signal to generate an addition result;
a subtracter, coupled to the second determination unit and the buffer space setting unit, for subtracting a decrement from the reserved space value according to the second control signal to generate a difference value result;
a second comparator, coupled to the adder, for comparing the addition result with a maximum value, and generating a third control signal accordingly; and
a third comparator, coupled to the subtracter, for comparing the difference value result with a minimum value, and generating a forth control signal accordingly.

9. The packet switch of claim 8 further comprising a plurality of connection detecting units, coupled to the plurality of network ports, the plurality of queue measurement units, and the buffer management unit, and each of the plurality of connection detecting units is utilized for detecting a network connection status of a corresponding network port every time before a corresponding one of the plurality of queue measurement units performs the measurement process.

10. The packet switch of claim 9, wherein the buffer management unit sets the dedicated buffer space of the output queue to zero when the network connection status indicates that the network port is unlinked.

11. The packet switch of claim 8, wherein when the first determination unit determines that each of at least the second number of comparison results among the first number of comparison results indicates that the measurement result is larger than or equal to the reserved space value, the first control signal, generated by the first determination unit, controls the reserved space value to be outputted to the adder.

12. The packet switch of claim 8, wherein when the first determination unit determines that among the first number of comparison results, the number of comparison results indicating that the measurement result is larger than or equal to the reserved space value is less than the second number, the first determination unit resets the count of the accumulated comparison results.

13. The packet switch of claim 8, wherein when the first determination unit determines that among the first number of comparison results, the number of comparison results indicates that the measurement result is larger than or equal to the reserved space value is less than the second number, the first determination unit accumulates one more comparison result, and determines whether each of at least the second number of comparison results among the first number of previous comparison results indicates that the measurement result is larger than or equal to the reserved space value.

14. The packet switch of claim 8, wherein when the second determination unit determines that whether each of at least the third number of comparison results among the first number of previous comparison results indicates that the measurement result is smaller than the reserved space value, the second control signal, generated by the second determination unit, controls the reserved space value to be outputted to the subtracter.

15. The packet switch of claim 8, wherein when the second determination unit determines that among the first number of comparison results, the number of comparison results indicating that the measurement result is smaller than the reserved space value is less than the third number, the second determination unit resets the count of the accumulated comparison results.

16. The packet switch of claim 8, wherein when the second determination unit determines that among the first number of comparison results, the number of comparison results indicating that the measurement result is smaller than the reserved space value is less than the third number, the second determination unit accumulates one more comparison result, and determines whether each of at least the third number of comparison results among the first number of previous comparison results indicates that the measurement result is smaller than the reserved space value.

17. The packet switch of claim 8, wherein when the second comparator performs comparison and hence be aware that the addition result is smaller than the maximum value, the third control signal controls the addition result to be outputted to the buffer space setting unit, to reset the reserved space value.

18. The packet switch of claim 8, wherein when the third comparator performs comparison and hence be aware that the subtraction result is larger than the minimum value, the forth control signal controls the subtraction result to be outputted to the buffer space setting unit, to reset the reserved space value.

* * * * *